United States Patent [19]
Kanda

[11] Patent Number: 4,749,174
[45] Date of Patent: Jun. 7, 1988

[54] FLUID-FILLED RESILIENT BUSHING HAVING DAMPING MEANS WITHIN FLUID CHAMBERS

[75] Inventor: Ryouji Kanda, Inuyama, Japan

[73] Assignee: Tokai Rubber Industries, Ltd., Aichi, Japan

[21] Appl. No.: 66,135

[22] Filed: Jun. 24, 1987

[30] Foreign Application Priority Data

Jun. 30, 1986 [JP] Japan .................. 61-100614[U]

[51] Int. Cl.$^4$ .................. F16M 1/02; F16M 5/00; F16M 7/00; B62D 21/00
[52] U.S. Cl. .................. 267/140.1; 180/312; 248/562
[58] Field of Search .............. 267/140.1, 35, 259, 267/219; 180/300, 312, 902; 248/562, 636

[56] References Cited

U.S. PATENT DOCUMENTS

| | | |
|---|---|---|
| 3,642,268 | 2/1972 | Hipsher . |
| 3,698,703 | 10/1972 | Hipsher . |
| 4,090,389 | 5/1978 | West .................. 248/562 X |
| 4,630,806 | 12/1986 | Dan et al. .................. 267/140.1 |
| 4,700,934 | 10/1987 | Andrä et al. .................. 248/562 X |
| 4,702,346 | 10/1987 | Uno et al. .................. 267/140.1 X |

FOREIGN PATENT DOCUMENTS 0010138 1/1986 Japan .................. 267/140.1

Primary Examiner—Andres Kashnikow
Assistant Examiner—Richard Potosnak
Attorney, Agent, or Firm—Parkhurst & Oliff

[57] ABSTRACT

A fluid-filled resilient bushing including an annular resilient member interposed between inner and outer sleeves, and a stopper block having a pair of stopper portions disposed in respective fluid chambers defined by the outer sleeve and the resilient member. The chambers are located opposite to each other in a first direction in which the bushing receives vibrations. The two chambers, filled with an incompressible fluid, communicate with each other through an orifice. The stopper portions extend from the inner sleeve toward the outer sleeve. Each stopper portion has a radial end face having an edge which is spaced apart from a periphery of the corresponding fluid chamber in a second direction perpendicular to the first direction, so as to define an annular spacing. A damping member is provided on the radial end face of at least one of the stopper portions. The damping member projects from the edge of the end face substantially in the second direction, such that the damping member cooperates with the periphery of the corresponding fluid chamber to define an annular gap smaller than the annular spacing.

14 Claims, 2 Drawing Sheets

FLUID-FILLED RESILIENT BUSHING HAVING DAMPING MEANS WITHIN FLUID CHAMBERS

BACKGROUND OF THE INVENTION

1. Field of the Invention

The present invention relates in general to a fluid-filled resilient or elastic bushing structure, and more particularly to such a bushing structure which is capable of exhibiting excellent spring characteristics for both low-frequency vibrations and high-frequency vibrations that are applied thereto in a diametric direction of the structure.

2. Discussion of the Prior Art

There is known a resilient bushing for elastically connecting two members in a vibration system (through which vibrations are transmitted), for damping and/or isolating vibrations applied to the bushing in a given diametric direction of the bushing. The bushing has an inner sleeve in which a mounting rod or bolt is inserted, an outer sleeve on which a cylindrical mounting member is fitted, and a resilient member interposed between the inner and outer sleeves. For example, such a resilient bushing is used as suspension bushings in a vehicle suspension system, or as engine mounts for mounting a power unit on the body of an F-F vehicle (front-engine, front drive vehicle).

Usually, the resilient bushing of the type indicated above is required to exhibit high vibration isolating characteristic for high-frequency vibrations having a small amplitude, and high vibration damping characteristic for low-frequency vibrations having a large amplitude. The traditional resilient bushing relies solely on the elastic nature (elastic deformation) of a resilient or elastic member, to provide both the vibration isolating capability and the vibration damping capability. Therefore, the bushing is difficult to satisfy these two different requirements. In particular, the traditional resilient bushing is not satisfactory in its capability of damping the low-frequency vibrations of large amplitudes.

In the light of the above inconvenience, a fluid-filled resilient bushing has been proposed in recent years. An example of such a fluid-filled bushing is disclosed in U.S. Pat. Nos. 3,642,268 and 3,698,703. This fluid-filled bushing has a pair of fluid chambers formed in an annular resilient member such that the fluid chambers are located opposite to each other in a diametric direction of the bushing in which vibrations are applied. These fluid chambers are filled with a suitable incompressible fluid, and communicate with each other through an orifice, so that the fluid may flow through the orifice, between the two chambers, upon application of low-frequency vibrations of a large amplitude in the diametric direction.

In the fluid-filled bushing indicated above, the input low-frequency vibrations can be effectively damped due to inertia and resonance of the fluid mass in the orifice when the fluid is forced to flow through the orifice. The frequency range of the vibrations to be damped can be selected by suitably dimensioning the orifice.

If the orifice of this type of fluid-filled resilient bushing is dimensioned (in terms of its length and cross sectional area or diameter) so as to provide excellent damping characteristic for vibrations in a low frequency range, then the vibration isolating capability of the bushing is accordingly reduced for the high-frequency vibrations having a small amplitude. Thus, there has been a need to develop a fluid-filled resilient bushing which is satisfactory in the overall vibration damping and isolating capability or characteristic.

SUMMARY OF THE INVENTION

It is therefore an object of the present invention to provide an improved fluid-filled resilient bushing which is capable of exhibiting not only excellent damping characteristic for low-frequency vibrations of large amplitudes, but also excellent isolating characteristic for high-frequency vibrations of small amplitudes.

The above object may be achieved according to the present invention, which provides a fluid-filled resilient bushing, comprising: (a) an inner sleeve; (b) an outer sleeve disposed in radially outwardly spaced-apart relation with the inner sleeve; (c) a generally annular resilient member interposed between the inner and outer sleeves, and having a pair of pockets open in an outer circumferential surface thereof, the pair of pockets being located opposite to each other in a substantially diametric direction of the resilient member parallel to a first direction in which the bushing receives a vibrational load, the pair of pockets cooperating with at least the outer sleeve to define a pair of fluid-tight fluid chambers filled with an incompressible fluid; (d) means for defining an orifice which communicates with the pair of fluid chambers and permits flows of the incompressible fluid therethrough between the pair of fluid chambers; (e) a stopper block supported by the inner sleeve, and having a pair of stopper portions which are disposed within the pair of fluid chambers and which extend from bottoms of the pair of pockets, respectively, toward the outer sleeve in a substantially radial direction of the resilient member, each of the stopper portions having a radial end face spaced apart from the outer sleeve by a predetermined radial distance in the first direction, the radial end face having a peripheral edge which is spaced apart from a periphery of the corresponding one of the fluid chambers in a second direction perpendicular to the first direction, the peripheral edge of the radial end face of the corresponding stopper portion and the periphery of the corresponding fluid chamber cooperating to define an annular spacing in a plane which is parallel to the second direction and an axial direction of the resilient member; and (f) a pair of projections provided on the radial end face of at least one of the pair of stopper portions of the stopper block. The damping means projects from the periphery of the corresponding stopper portion substantially in the second direction, such that the damping means cooperates with the periphery of the corresponding fluid chamber, to define in the above-indicated plane an annular gap which is smaller than the annular space formed between the peripheral edge of the radial end face of the stopper portion and the periphery of the fluid chamber.

In the fluid-filled resilient bushing of the present invention constructed as described above, input vibrations having comparatively low frequencies and comparatively large amplitudes may be effectively damped or attenuated, due to inertia and resonance of the fluid in the orifice when the fluid is forced to flow through the orifice between the two fluid chambers, upon application of the vibrations to the bushing in the direction in which the fluid chambers are disposed in diametrically opposed relation with each other. Namely, the orifice permitting a restricted flow of the fluid therethrough is so dimensioned as to attain excellent damping of low-frequency vibrations of large amplitudes.

Since the orifice is dimensioned as described above, the orifice does not permit sufficient flows of the fluid therethrough when the bushing receives high-frequency vibrations having a small amplitude. Namely, the bushing cannot rely upon the fluid flows through the orifice, to provide a sufficiently low dynamic spring constant for isolating such high-frequency vibrations. However, the instant bushing is capable of isolating the high-frequency vibrations, due to inertia and resonance of the fluid masses which flow through the annular gap formed between the periphery of the fluid chamber, and the damping means which projects from the periphery of the radial end face of the stopper portion of the stopper block within the fluid chamber. More particularly, the high-frequency vibrations applied to the bushing in the diametric direction will cause the fluid to flow through the annular gap in the radial direction of the bushing, between the radially inner and outer sections of the fluid chamber which are substantially separated by the damping means. In other words, the damping means is dimensioned and positioned relative to the periphery of the fluid chamber, so as to isolate vibrations which have higher frequencies and larger amplitudes than those of the vibrations that can be damped by the restricted fluid flows through the orifice.

Thus, low-frequency vibrations of large amplitudes can be damped due to the inertia and resonance of the fluid masses which are forced to flow through the orifice, as in the conventional fluid-filled bushing, while high-frequency vibrations of small amplitudes can be effectively isolated or blocked by the inertia and resonance of the fluid mass or masses which are forced to flow through the annular gap or gaps formed between the damping means and the periphery of the corresponding fluid chamber or chambers. Hence, the present fluid-filled resilient bushing exhibits better vibration isolating characteristic over the conventional bushing, and therefore provides improved overall damping and isolating capability for the vibrations applied in the diametric direction in which the two fluid chambers are arranged in mutually opposed relation.

Furthermore, the stopper portions disposed within the fluid chambers are adapted to be abuttable at their end faces upon the inner surface of the outer sleeve, in the event that the inner and outer sleeves are excessively displaced relative to each other in the radial direction. Accordingly, the stopper block protects the annular resilient member between the inner and outer sleeves, from excessive elastic deformation upon excessive relative displacement between the two sleeves.

According to one feature of the present invention, the damping means is provided on the radial end face of each of the pair of stopper portions of the stopper block. However, it is possible that the damping means is provided on only one of the two stopper portions. In this case, too, the vibration isolating effect of the instant bushing can be improved over the conventional bushing.

According to another feature of the invention, the damping means forms a peripheral portion of a restrictor member secured to the radial end face of the corresponding one of the stopper portions. In one form of this feature of the invention, the restrictor member has a pair of axial projections which project from the peripheral edge of the radial end face of the corresponding stopper portion in an axial direction of the generally annular resilient member, a pair of circumferential projections which project from the corresponding stopper portion in a substantially circumferential direction of the generally annular resilient member, such that the circumferential projections are spaced apart from an inner circumferential surface of the outer sleeve by a predetermined distance in the second direction. In another form of the same feature of the invention, the restrictor member includes a radially inner metallic portion secured to the radial end of the corresponding stopper portion, and a radially outer elastic portion secured to the radially inner metallic portion.

In a further form of the above feature of the invention, the restrictor member has a generally arcuate cross sectional shape taken in a plane perpendicular to an axis of the bushing. In a still further form of the same feature, the restrictor member is secured to the radial end face of the corresponding stopper portion by threaded fastening means.

In a still further form of the same feature of the invention, a dimension of the peripheral portion of the restrictor member as measured in the first direction, and an area of the annular gap as measured in the plane parallel to the second direction and the axis of the bushing, are determined so that high-frequency vibrations are isolated in the fluid chamber in which the restrictor member is disposed.

According to a still further feature of the invention, the stopper block constitutes the means for defining an orifice. For instance, the stopper block has a pair of fluid passages formed therethrough in communication with the pair of fluid chambers, so that the fluid passages have a predetermined resistance to flows of the incompressible fluid therethrough, and thereby function as the orifice.

In accordance with a yet further feature of the invention, the pair of pockets are formed in an axially middle portion of the generally annular resilient member.

The bushing may further comprise a rigid pre-compression sleeve disposed between the outer sleeve and the generally annular resilient member. The pre-compression sleeve is adapted to fit on the resilient member, so as to give the resilient member a predetermined amount of radial pre-compression. The pre-compression sleeve has a pair of apertures aligned with the pair of stopper portions of the stopper block, to permit the stopper portions to abut on the outer sleeve. The bushing may further comprise a sealing rubber layer disposed between the outer sleeve and the rigid pre-compression sleeve, for maintaining fluid-tightness of the pair of fluid chambers.

BRIEF DESCRIPTION OF THE DRAWINGS

The above and optional objects, features and advantages of the present invention will become more apparent by reading the following detailed description of a preferred embodiment of the invention, when considered in conjunction with the accompanying drawings, in which.

DETAILED DESCRIPTION OF THE PREFERRED EMBODIMENT

To clarify the concept of the present invention, the vehicle suspension bushing embodying the invention will be described in detail, by reference to the accompanying drawings.

Figure 1:
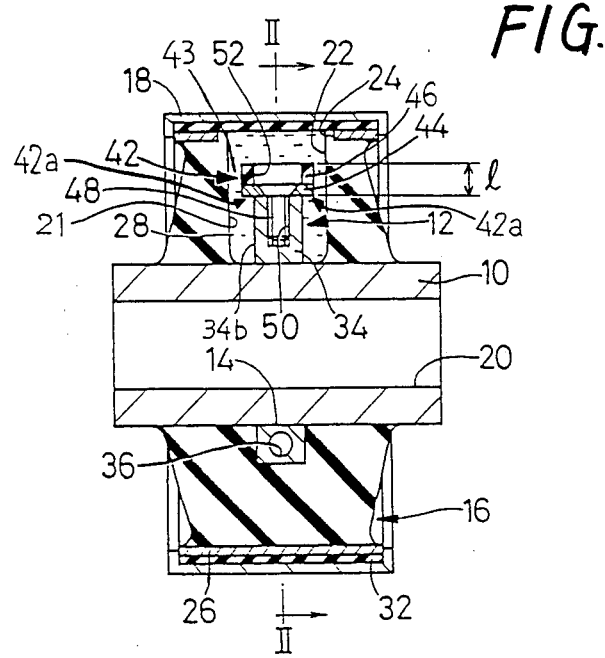
FIG. 1 is an elevational view in axial cross section of one embodiment of a fluid-filled resilient bushing of the invention in the form of a suspension bushing for an automotive vehicle, taken along line I—I of FIG. 2.
Figure 2:
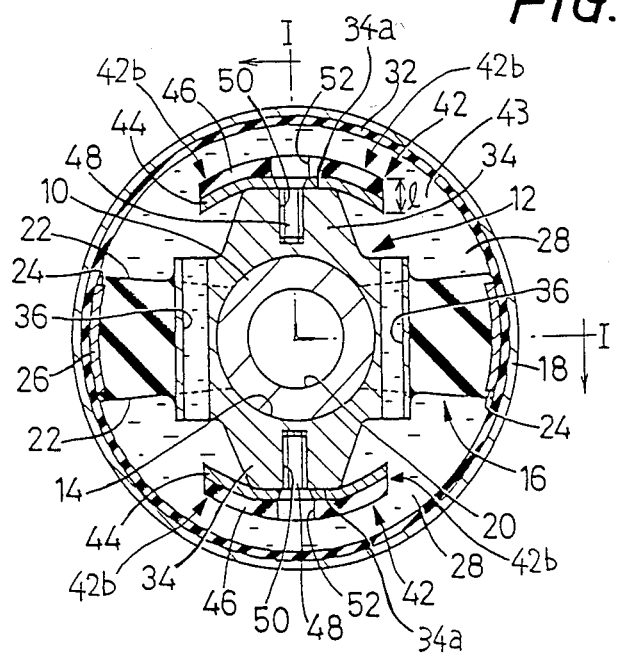
FIG. 2 is an elevational view in transverse cross section of the resilient bushing, taken along line II—II of FIG. 1.

Referring first to FIGS. 1 and 2, reference numeral 10 designates an inner sleeve which is made of a metallic material, and which has a comparatively large wall thickness. On the outer surface of an axially intermediate portion of the inner sleeve 10, there is press-fitted a stopper block 12, such that a center bore 14 formed through the block 12 engages the outer surface of the inner sleeve 10. A resilient member in the form of a generally annular rubber block 16 is secured to the outer surface of the inner sleeve 10 by means of vulcanization, such that the rubber block 16 surrounds the stopper block 12, with diametrically opposite portions of the stopper block 12 being held in contact with the rubber block 16, as shown in FIG. 2. An outer sleeve 18 made of a metallic material is fitted on the rubber block 16 via a rigid pre-compression sleeve 26 and a sealing rubber layer 32, which will be described. The present fluid-filled suspension bushing is adapted to flexibly connect two members of a suspension system of a motor vehicle, such that a mounting rod secured to one of the two members is inserted through a bore 20 of the inner sleeve 10, while a cylindrical fitting secured to the other of the two member is fitted on the outer surface of the outer sleeve 18. The rubber block 16 is formed concentrically with the concentric inner and outer sleeves 10, 18.

Figure 4:
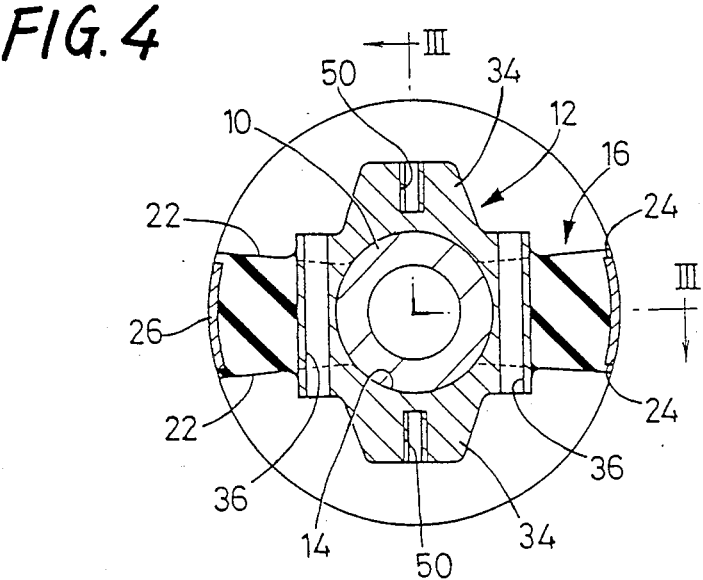
FIG. 4 is a cross sectional view taken along line IV—IV of FIG. 3.

In an axially middle portion of the rubber block 16, there are formed a pair of pockets 22, 22 which are open in the outer circumferential surface of the rubber block 16. As most clearly shown in FIGS. 2 and 4, these pockets 22 are disposed opposite to each other in the diametric direction of the inner sleeve 10 which is parallel to a direction in which the bushing is adapted to receive a vibrational load. More specifically, the rubber block 16 has a pair of axially opposed surfaces 21, 21 defining an axial dimension of each pocket 22, which is larger than the axial dimension of the stopper block 12 by a suitable amount. The bottoms of the pockets 22, 22 are defined by the outer circumferential surface of the inner sleeve 10. As shown in FIGS. 2 and 4, the pockets 22 are formed to cover substantive portions of the respective halves of the circumference of the inner and outer sleeves 10, 18.

Figure 3:
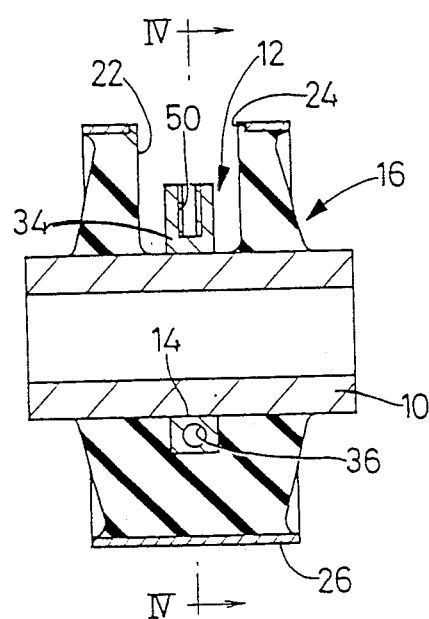
FIG. 3 is a cross sectional view corresponding to that of FIG. 1, taken along line III—III of FIG. 4, showing a resilient member vulcanized on an inner sleeve of the bushing.
Figure 5:
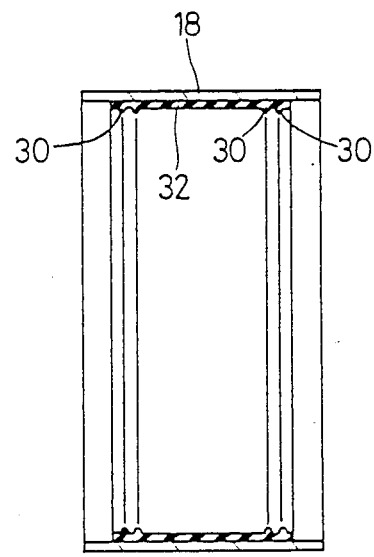
FIG. 5 is a cross sectional view corresponding to that of FIG. 1, showing an outer sleeve before the bushing is assembled.

The rigid cylindrical pre-compression sleeve 26 indicated above is also made of a metallic material and is secured to the outer surface of the rubber block 16 by means of vulcanization. The pre-compression sleeve 26 has a pair of apertures 24, 24 aligned with the openings of the pockets 22, 22, as illustrated in FIGS. 3 and 4. The outer sleeve 16 which is fitted on the pre-compression sleeve 26 is provided with the sealing rubber layer 32 secured to its inner surface, as shown in FIG. 5. Thus, the pockets 22, 22 are fluid-tightly closed by the outer sleeve 16, and the sealing rubber layer 32 fluid-tightly interposed between the outer sleeve 16 and the pre-compression sleeve 26, whereby a pair of fluid-tight fluid chambers 28, 28 are formed, as indicated in FIGS. 1 and 2. In the present embodiment, an operation to fit the outer sleeve 18 with the rubber layer 32 onto the pre-compression sleeve 26 is carried out within a suitable incompressible fluid such as water, alkylene glycols, polyalkylene glycols, silicone oil, low molecular weight polymers, or a mixture thereof. In this fitting process, the fluid chambers 28, 28 are filled with the incompressible fluid.

The sealing rubber layer 32 is secured to the inner surface of the outer sleeve 18 by means of vulcanization. As shown in FIG. 5, the rubber layer 32 is formed at its opposite axial ends with sealing lips 30, which assure increased fluid tightness between the outer and pre-compression sleeves 18, 26, whereby the fluid tightness of the fluid chambers 28, 28 is maintained. In assembling the instant bushing, the rigid pre-compression sleeve 26 fitting on the rubber block 16 is subjected to a suitable drawing operation to compress the rubber block 16 in the radially inward direction, i.e., to give the rubber block 16 is a suitable amount of radial pre-compression. The drawing operation may be achieved, for example, by using eight dies disposed around the sleeve 26. Also, the outer sleeve 18 fitting on the pre-compresion sleeve 26 is subjected to a similar drawing operation. Then, the opposite axial ends of the outer sleeve 18 are roll-caulked against the corresponding ends of the pre-compression sleeve 26.

The stopper block 12 has a base portion through which the center bore 14 is formed. The base portion has a generally rectangular shape in transverse cross section, as seen in FIGS. 2 and 4. The stopper block 12 includes a pair of stopper portions 34, 34 having a truncated cross sectional shape, which extend in the radial direction of the bushing, from the opposite sides of the rectangle of the base portion which are exposed to the fluid chambers 28, 28. The stopper block 12 is press-fitted on the outer surface of the inner sleeve 10 such that the stopper portions 34, 34 are positioned in the middle of the respective fluid chambers 28, 28 in the circumferential direction of the bushing. Thus, the stopper portions 34, 34 are located opposite to each other in the diametric direction of the bushing parallel to the direction in which a vibrational load is applied to the bushing. This direction is hereinafter referred to as "vibration-input direction". Each of the stopper portions 34, 34 has a radial end face 34a which is spaced apart from the outer sleeve 18 by a suitable radial distance, as indicated in FIG. 2. The peripheral edge of the radial end face 34a cooperates with the outer sleeve 18 (sealing rubber layer 32) and the axially opposed surfaces 21 of the rubber block 16, to define a rectangularly annular spacing in a plane which is parallel to the axis of the bushing and perpendicular to the vibration-input direction (in which the fluid chambers 28, 28 are disposed in mutually opposed relation). Each stopper portion 34 has a pair of side surfaces 34b which face the axially opposed surfaces 21 of the rubber block 16 that define the axial dimension of the corresponding fluid chamber 28 (pocket 22). The stopper portions 34, 34 are dimensioned and positioned such that the side surfaces 34b are spaced apart from the corresponding axially opposed surfaces 21 of the rubber block 16, by a suitable axial distance.

The stopper block 12 has a pair of communication passages 36, 36 formed through its base portion, along the opposite sides of the rectangle of the base portion which are held in contact with the rubber block 16. These passages 36, 36 are open at their opposite ends in the fluid chambers 28, 28, whereby the two fluid chambers communicate with each other through the passages 36, 36. The length and cross sectional area of these passages 36, 36 are determined so as to effectively damp low-frequency vibrations of a large amplitude, due to inertia of the masses of the incompressible fluid existing in the passages 36, 36, and/or resonance of these fluid masses within the passages. Thus, the fluid passages 36, 36 constitute an orifice communicating with the two fluid chambers 28, 28, primarily for damping the low-frequency vibrations.

As shown in FIGS. 1 and 2, a pair of restrictor members 42, 42 are fixedly disposed on the radial end faces 34a of the corresponding pair of stopper portions 34, 34 of the stopper block 12. The restrictor members 42, 42 have a generally arcuate shape in transverse cross section of the bushing as seen in FIG. 2, and a rectangular shape in axial cross section of the bushing as seen in FIG. 1. Each restrictor member 42 has a peripheral portion consisting of a pair of axial projections 42a and a pair of circumferential projections 42b. The axial projections 42a project in the axial direction of the bushing, from the side surfaces 34b of the corresponding stopper portion 34 of the stopper block 12, more precisely, from the axial ends of the radial end face 34a (FIG. 2), by a suitable axial distance, so that the ends of the axial projections 42a are spaced apart from the corresponding axially opposed surfaces 21 of the rubber block 16, by a suitable axial distance, as indicated in FIG. 1. The circumferential projections 42b project from the peripheral edge of the radial end face 34a in substantially the circumferential direction of the bushing, such that the ends of the circumferential projections 42b are spaced apart from the periphery of the fluid chamber 28, more precisely, from the inner surface of the outer sleeve 18 (sealing rubber layer 32), in the direction perpendicular to the vibration-input direction.

Thus, the axial and circumferential projections 42a, 42b of the restrictor member 42 cooperate with the axially opposed surfaces 21, 21 and the outer sleeve 18 (rubber layer 32), to define a rectangularly annular gap 43 in the plane in which the previously indicated rectangularly annular spacing around the periphery of the radial end face 34a of the stopper portion 34 is formed with respect to the periphery of the fluid chamber 18. This annular gap 43 formed around the periphery of the axial and circumferential projections 42a, 42b of the restrictor member 42, is obviously smaller than the annular spacing indicated above, since the projections 42a, 42b project from the periphery of the radial end face 34a of the stopper portion 34. Thus, the axial and circumferential projections 42a, 42b substantially divide the fluid chamber 28 into a radially inner section and a radially outer section, which communicate with each other through the comparatively narrow annular gap 43. When a vibrational load is applied to the bushing in the direction (vibration-input direction) in which the fluid chambers 28, 28 are disposed, the incompressible fluid is forced to flow between the radially inner and outer sections of each fluid chamber 28, in the radial direction of the bushing, through the annular gap 43.

The axial projections 42a and the circumferential projections 42b of each restrictor member 42 serve as damping means disposed within the corresponding fluid chamber 28, primarily for isolating high-frequency vibrations having a small amplitude. More specifically described, a dimension l of the projections 42a, 42b as measured in the vibration-input direction, and an area of the annular gap 43 as measured in the plane perpendicular to the vibration-input direction and parallel to the axial direction of the bushing, are determined so that vibrations having a frequency range higher than that of the vibrations to be damped by the orifice (passages 36, 36) may be effectively isolated, due to inertia of a mass of the incompressible fluid existing in the annular gap 43, and due to resonance of the fluid mass adjacent to the projections 42a, 42b, when the fluid is forced to flow through the annular gap 43 in the radial direction of the bushing upon application of such vibrations having comparatively high frequencies.

Each of the arcuate restrictor members 42 consists of an inner metallic portion 44, and an outer rubber layer 46 secured to the outer surface of the inner metallic portion 44 by vulcanization. As most clearly shown in FIG. 2, the restrictor member 42 is attached to the radial end face 34b of the corresponding stopper portion 34, by a screw 48 threaded in a tapped hole 50 formed in the stopper portion 34. Reference numeral 52 designates an access hole formed in the rubber layer 46, for driving the screw 48 into the tapped hole 50.

In the present fluid-filled suspension bushing constructed as described above, the incompressible fluid is forced to flow through the orifice, i.e., fluid passages 36, 36 from one of the two chambers 28, 28 to the other, when the bushing receives low-frequency vibrations of a large amplitude in the direction of arrangement of the two chambers 28, 28, causing a relative displacement between the inner and outer sleeves 10, 18. In this event, the input low-frequency vibrations can be effectively damped, by means of the orifice 36, 36 providing a resistance to the flow of the fluid due to inertia and resonance of the fluid masses in the two fluid chambers 28, 28, when the fluid is forced to flow through the passages 36, 36. Thus, the present suspension bushing exhibits excellent damping characteristic for low-frequency vibrations, like a conventional fluid-filled resilient bushing.

Where the vibrations applied to the bushing in the direction of arrangement of the fluid chambers 28, 28 have a relatively high frequency and a relatively small amplitude, the fluid is less likely or difficult to flow through the orifice 36, 36, and the dynamic spring constant of the bushing cannot be reduced to an extent sufficient to isolate such high-frequency vibrations. In this case, however, the high-frequency vibrations applied to the bushing cause restricted radial flows of the fluid through the annular gaps 43, 43, formed within the individual fluid chambers 28, 28, whereby the high-frequency vibrations can be effectively isolated due to inertia and resonance of the fluid masses present in the annular gaps 43, 43 and adjacent to the projections 42a, 42b, while the fluid is forced to flow between the radially inner and outer sections of each chamber 28. Therefore, the present fluid-filled resilient bushing is capable of exhibiting improved high-frequency vibration isolating characteristic, over the conventional counterpart without such annular gaps (43, 43).

It will be understood from the above description that the present suspension bushing is substantially equivalent to the conventional bushing in terms of damping characteristic for low-frequency vibrations of a large amplitude, and is significantly improved over the conventional bushing, in terms of isolating characteristic for high-frequency vibrations of a small amplitude. This indicates totally improved vibration damping and isolating capability of the fluid-filled resilient bushing constructed according to the invention.

Where the inner and outer sleeves 10, 18 are excessively replaced relative to each other in the radial direction, the radial end 34a of the appropriate stopper portion 34 of the stopper block 12 (more precisely, the outer rubber layer 46 of the arcuate restrictor member 42) will abut upon the inner surface of the outer sleeve 18 (more precisely, the sealing rubber layer 32). That is, the radial ends 34a of the stopper portions 34 are positioned within the respective fluid chambers 28, 28, with a suitable radial distance to the inner surface of the outer sleeve 18, in order to prevent an excessive relative radial displacement between the inner and outer sleeves 10, 18 by the abutting contact of the radial ends 34a with the outer sleeve 18, and thereby protect the rubber block 16 against an excessive amount of elastic deformation upon application of an excessive vibrational load to the bushing.

It is noted that the length and cross sectional area of the fluid passages 36, 36 for restricted fluid communication between the diametrically opposed fluid chambers 28, 28 are determined as needed, depending upon a desired relatively low frequency range of vibrations to be damped.

Further, the dimension l of the projections 42a, 42b, and the area of the annular gaps 43, 43 are selected as needed, depending upon a desired relatively high frequency range of vibrations to be isolated.

While the present invention has been described in its preferred embodiment with a certain degree of particularity, for illustrative purpose only, it is to be understood that the invention is by no means confined to the precise details of the illustrated embodiment, but may be otherwise embodied.

For instance, while the restrictor members 42 having the projections 42a, 42b serving as damping means in the illustrated embodiment are formed separately from the stopper block 12, the restrictor members 42 or their inner metallic portions 44 may be formed as integral part of the stopper block 12.

In the illustrated embodiments, the restrictor members 42 which partially define the annular gaps 43, 43 are provided on both of the two stopper portions 34, 34 of the stopper block 12. However, it is possible to provide only one of the stopper portions 34, 34 with the restrictor member 42.

Although the passages 36, 36 constituting an orifice are formed through the rectangular base portion of the stopper block 12, these passages 36, 36 or other forms of an orifice may be formed in the other portions of the stopper block 12, or in the other member such as the inner sleeve 10.

While the illustrated embodiment of the fluid-filled bushing has been described as a bushing used in the suspension system of an automotive vehicle, the present bushing may also be used for the other purposes, for example, as an engine mount for mounting a power unit to an F-F (front-engine front-drive) vehicle. Inm the case where the present bushing is used as an engine mount for the F-F vehicle, it is common that the inner and outer sleeves (10, 18) are disposed eccentrically with each other (in the direction of arrangement of the fluid chambers 28, 28), in a non-load state (while the bushing is not installed in place), so that these two sleeves are brought into concentric relation when the bushing is installed while receiving the weight of the power unit.

It is further to be understood that the invention may be embodied with various other alterations, modifications and improvements which may occur to those skilled in the art, without departing from the spirit and scope of the invention defined in the following claims.

What is claimed is:

1. A fluid-filled resilient bushing, comprising:
    an inner sleeve;
    an outer sleeve disposed in radially outwardly spaced-apart relation with said inner sleeve;
    a generally annular resilient member interposed between said inner and outer sleeves, and having a pair of pockets open in an outer circumferential surface thereof, said pair of pockets being located opposite to each other in a substantially diametric direction of said resilient member parallel to a first direction in which the bushing receives a vibrational load, said pair of pockets cooperating with at least said outer sleeve to define a pair of fluid-tight fluid chambers filled with an incompressible fluid;
    means for defining an orifice which communicates with said pair of fluid chambers and permits flows of said incompressible fluid therethrough between said pair of fluid chambers;
    a stopper block supported by said inner sleeve, and having a pair of stopper portions which are disposed within said pair of fluid chambers and which extend from bottoms of said pair of pockets, respectively, toward said outer sleeve in a substantially radial direction of said resilient member, each of said stopper portions having a radial end face spaced apart from said outer sleeve by a predetermined raidal distance in said first direction, said radial end face having a peripheral edge which is spaced apart from a periphery of the corresponding one of said pair of fluid chambers in a second direction perpendicular to said first direction, said peripheral edge of said radial end face and said periphery of said corresponding fluid chamber cooperating to define an annular spacing in a plane which is parallel to said second direction and an axial direction of said resilient member; and
    damping means provided on said radial end face of at least one of said pair of stopper portions of said stopper block, said damping means projecting from said peripheral edge of said radial end face of the corresponding one of said pair of stopper portion substantially in said second direction, such that said damping means cooperates with said periphery of said corresponding one fluid chamber, to define in said plane an annular gap which is smaller than said annular spacing.

2. A fluid-filled resilient bushing according to claim 1, wherein said damping means is provided on the radial end face of each of said pair of stopper portions of said stopper block.

3. A fluid-filled resilient bushing according to claim 1, wherein said damping means forms a peripheral portion of a restrictor member secured to said radial end face of the corresponding one of said stopper portions.

4. A fluid-filled resilient bushing according to claim 3, wherein said restrictor member has a pair of axial projections which project from said peripheral edge of said radial end face of the corresponding stopper portion in an axial direction of said generally annular resilient member, and a pair of circumferential projections which project from said peripheral edge of said radial end face of said corresponding stopper portion in a substantially circumferential direction of said generally annular resilient member, said pair of circumferential projections being spaced apart from an inner circumferential surface of said outer sleeve by a predetermined distance in said second direction.

5. A fluid-filled resilient bushing according to claim 3, wherein said restrictor member includes a radially inner metallic portion secured to said radial end of said corresponding stopper portion, and a radially outer elastic portion secured to said radially inner metallic portion.

6. A fluid-filled resilient bushing according to claim 3, wherein said restrictor member has a generally arcuate cross sectional shape in a plane perpendicular to an axis of the bushing.

7. A fluid-filled resilient bushing according to claim 3, wherein said restrictor member is secured to said radial end face of said corresponding stopper portion by threaded fastening means.

8. A fluid-filled resilient bushing according to claim 3, wherein a dimension of said peripheral portion of said restrictor member as measured in said first direction, and an area of said annular gap as measured in said plane, are determined so that high-frequency vibrations are isolated in said corresponding one fluid chamber.

9. A fluid-filled resilient bushing according to claim 1, wherein said stopper block constitutes said means for defining an orifice.

10. A fluid-filled resilient bushing according to claim 1, wherein said stopper block has a pair of fluid passages formed therethrough in communication with said pair of fluid chambers, said fluid passages having a predetermined resistance to flows of said incompressible fluid therethrough, and thereby constituting said orifice.

11. A fluid-filled resilient bushing according to claim 1, wherein said pair of pockets are formed in an axially middle portion of said generally annular resilient member.

12. A fluid-filled resilient bushing according to claim 1, further comprising a rigid pre-compression sleeve disposed between said outer sleeve and said generally annular resilient member, said pre-compression sleeve giving said resilient member a predetermined amount of radial pre-compression, said pre-compression sleeve having a pair of apertures aligned with said pair of stopper portions of the stopper block, to permit said stopper portions to abut on said outer sleeve.

13. A fluid-filled resilient bushing according to claim 12, further comprising a sealing rubber layer disposed between said outer sleeve and said rigid pre-compression sleeve, for maintaining fluid-tightness of said pair of fluid chambers.

14. A fluid-filled resilient bushing according to claim 1, wherein said inner and outer sleeves are disposed eccentrically with each other in said first direction, so that the inner and outer sleeves are brought into concentric relation when the bushing mounted in place.

* * * * *